(12) United States Patent
Zhang

(10) Patent No.: US 6,310,623 B1
(45) Date of Patent: Oct. 30, 2001

(54) METHOD FOR MANUAL EDITING OF A CLOSED CONTOUR

(75) Inventor: Xiangmin Zhang, Sunnyvale, CA (US)

(73) Assignee: Scimed Life Systems, Inc., Maple Grove, MN (US)

( * ) Notice: Subject to any disclaimer, the term of this patent is extended or adjusted under 35 U.S.C. 154(b) by 0 days.

(21) Appl. No.: 09/086,358

(22) Filed: May 28, 1998

(51) Int. Cl.$^7$ .................................................. G06K 9/36
(52) U.S. Cl. .................................................. 345/442
(58) Field of Search ................................ 345/442, 441, 345/433, 439, 703

(56) References Cited

U.S. PATENT DOCUMENTS

| | | | |
|---|---|---|---|
| 5,337,404 | 8/1994 | Baudelaire et al. | 395/141 |
| 5,431,161 | 7/1995 | Ryals et al. | 128/653.1 |
| 5,610,996 | 3/1997 | Eller | 382/187 |
| 5,632,008 | 5/1997 | Yokoyama | 395/142 |
| 5,757,971 * | 5/1998 | Lee | 382/241 |
| 5,805,736 * | 9/1998 | Kim | 382/242 |
| 5,881,183 * | 3/1999 | Lee | 382/288 |
| 5,883,977 * | 3/1999 | Kim | 382/242 |
| 6,011,588 * | 1/2000 | Kim | 348/390 |

FOREIGN PATENT DOCUMENTS 0 535 894 A2  7/1993 (EP) .
WO 97/34261  9/1997 (WO) .

* cited by examiner

*Primary Examiner*—Mark R. Powell
(74) *Attorney, Agent, or Firm*—Townsend and Townsend and Crew LLP

(57) ABSTRACT

A closed contour editing method is provided for use in manually defining and changing an intravascular ultrasonic image segment consisting of a single lobe displayed on a computer screen comprises marking end points of the segment to be changed, drawing the change between the endpoints while leaving all segments displayed, calculating the three centroids for each of the three resultant segmentations of the contour and based on the results, selecting the preferred segment to close the contour while simultaneously deselecting the undesired segment.

3 Claims, 2 Drawing Sheets

METHOD FOR MANUAL EDITING OF A CLOSED CONTOUR

BACKGROUND OF THE INVENTION

This invention relates to manual line graphics editing, particularly as applied to real-time applications, such as used for segment selection of an intravascular ultrasonic image. This invention applies specifically to closed contour editing for defining a boundary on a cross-sectional plane of a vascular image.

Manual editing is a very useful tool in medical imaging, especially when segmentation is needed to obtain measurements. Because no suitable automated methods are available to detect segments of medical images in known medical imaging systems, reliance on manual tracing is needed.

Manual editing is also very important for automated detection requiring observer supervision. In particular instances, there is a need to manually edit portions of the computer detection for further analysis.

Several manual editing methods are currently available for drawing closed contours. In one known method, a user can draw the contour using a computer mouse or other drawing device. During the tracing, the user must erase part or all of the drawing through a continuous process of deleting the current end point of the drawing. Once the drawing is completed, no modification is allowed except the deletion of the entire contour. In other known methods, the contour is segmented among a set of control vertices. By pulling the vertices, the user can adjust the contour locally. More vertices may be inserted while redundant vertices may be removed. Although this method provides the ability to change the contour, it requires substantial amount of user interaction.

Another method allows the user to indicate two points on the contour after which the user first deletes the segment to be changed and then draws the new segment. This method requires still additional interaction, and the user cannot compare the new segment with the old segment.

SUMMARY OF THE INVENTION

According to the present invention, a closed contour editing method for manually defining and for changing a bounded portion on an intravascular ultrasonic image comprises marking end points of a contour segment to be changed on a single lobe displayed on a computer screen, and/or drawing the change between the endpoints while leaving all segments displayed, calculating the three centroids for each of the three resultant regions which the segmentations of the contour defined and, based on the results, selecting the preferred segment to close the contour while simultaneously deselecting the undesired segment.

In this method, user is allowed to draw the contour either by continuously drawing the points of the contour or simply by indicating vertices of a polygon, and a visible line is generated to connect two consecutive vertices before the old line is deleted. Once the contour has been decided upon, the drawing is completed by automatically generating a replacement line to join the starting and end points closing the contour.

The core of this invention is the algorithm for editing segments of a contour. In this method, user can start to draw a new segment over any segment to be changed. The new segment can be drawn in any directions, clockwise or anti-clockwise. If done, the old segment will be replaced by the new one. This process can be repeated unlimited times until the user is satisfied.

The invention will be better understood upon reference to the following detailed description in connection with the accompanying drawings.

DESCRIPTION OF SPECIFIC EMBODIMENTS

Figure 1:
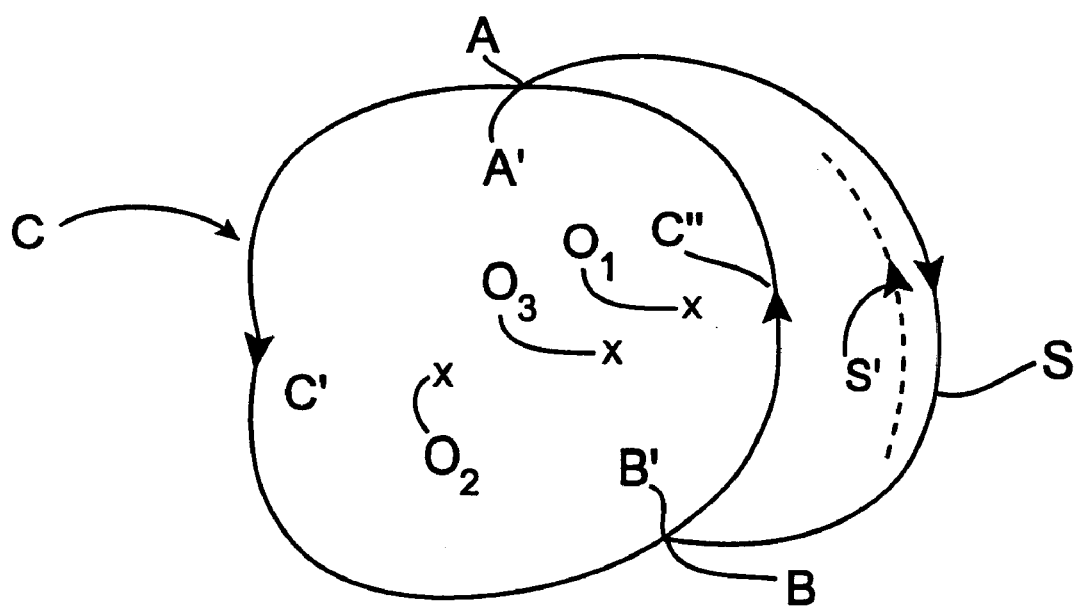
FIG. 1 is a drawing of a closed contour showing the operation of the invention.

FIG. 1 is an example of a closed contour which is edited. Let C be a closed contour. Let S be the new segment drawn. Let A and B be the beginning and end points of S.

Points A' and B' are two points on contour C corresponding to respective points A and B which have minimum distances to A and B. Points A' and B' divide C into two segments C' and C".

The segments each have a direction, either as a result of the order of the creation of the segment or by convention. The directions of all three segments are indicated by ^ in FIG. 1. Assume a change to the segment which close to the new drawing, in this case, C".

According to the invention, the centroid positions of the three segments is used to determine which segment is to be replaced. The centroid position of each segment is calculated and then the segment to be replaced is selected on the basis of the resultant centroid location.

The method according to the invention involves the following steps:

1. Find the point on C with minimum distance to A, denoted as A'.

2. Find the point on C with minimum distance to B, denoted as B'.

3. Divide contour C into two segment C' and C".

4. Compute centroids for S, C', and C". Let the locations be designated 01, 02, and 03, respectively, with appropriate coordinates.

5. Invoke the function: If the separation between 01 and 02 is greater than the separation of 01 and 03, then replace segment C" with S. (If |01–02|>|01–03|, segment C" is replaced by S). If S and C" are of opposite direction, S is reversed to S'. The final contour becomes either C'–B' B–S'–A A' or C'–B' B–S–A A'.

6. Otherwise if the separation between 01 and 02 is less than the separation of 01 and 03, then replace segment C' with S. (If |01–02|<|01–03|, segment C' is replaced by S). If S and C' have opposite direction, S is reversed to S'. The final contour becomes either C"–A' A–S'–B B' or C"–A' A–S–B B'.

Figure 2:
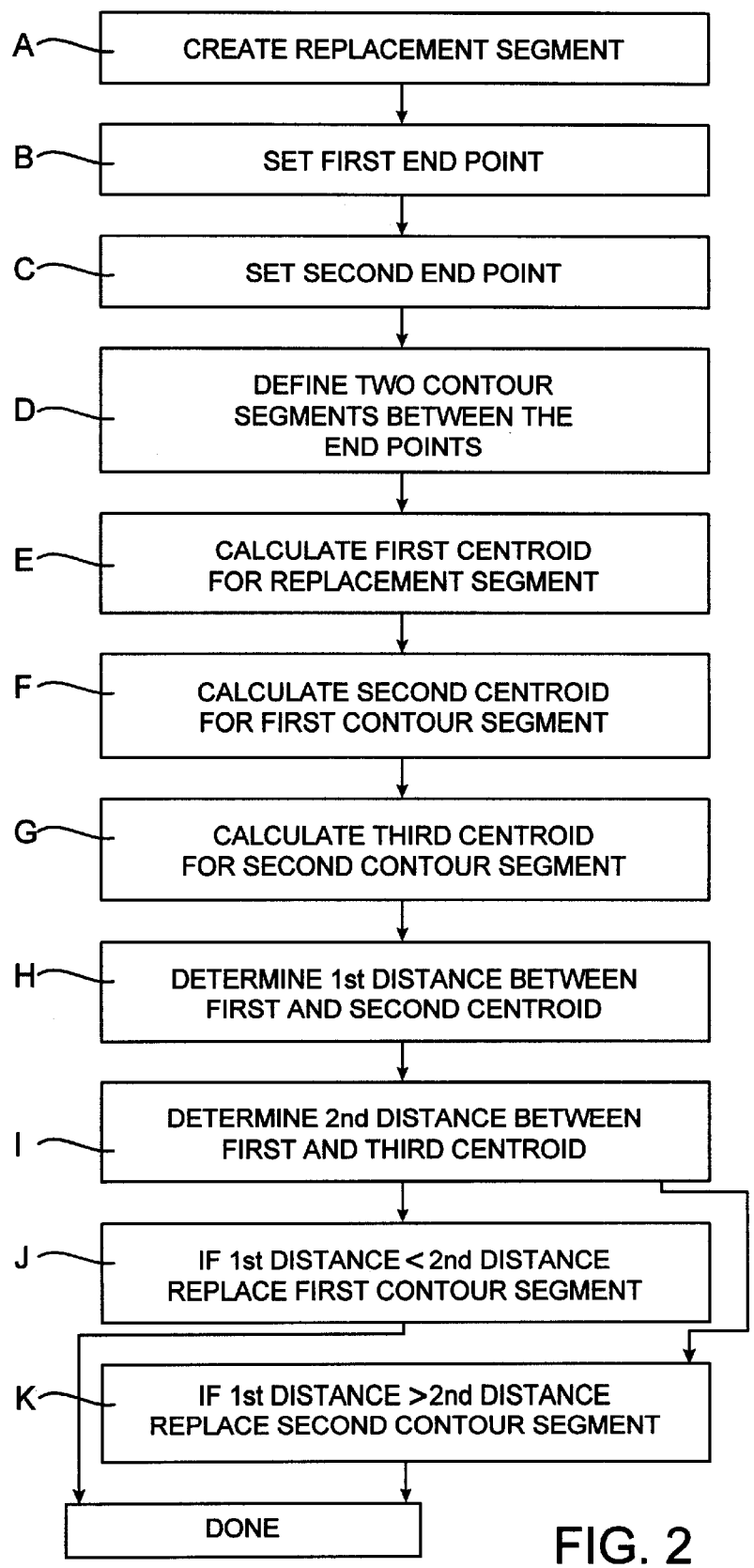
FIG. 2 is a flow chart of the method according to the invention.

Referring to FIG. 2, there is a flow chart of a specific method according to the invention. The steps include:

creating a replacement segment (Step A);

establishing a first end point of the replacement segment at a first intersection point of the closed contour (Step B);

establishing a second end point of the replacement segment at a second intersection point of the closed contour (Step C);

defining a first contour segment and a second contour segment of the closed contour between the first intersection point and the second intersection point (Step D);

calculating for the replacement segment a first centroid (Step E);

calculating for the first contour segment a second centroid (Step F);

calculating for the second contour segment a third centroid (Step G);

determining as a first distance value the difference between the first centroid and the second centroid (Step H);

determining as a second distance value the difference between the first centroid and the third centroid (Step I);

replacing the first contour segment with the replacement contour segment if the first distance value is less than the second distance value (Step J); otherwise replacing the second contour segment with the replacement contour segment if the second distance value is less than the first distance value (Step K).

Once the new contour is constructed, a smoothing filter with a specified window can be used to improve the appearance or remove minor mistakes, if preferred. For example, the coordinates of a specified number of neighboring points, P1, P2, . . . , P2k+1, may be averaged and used as the new coordinates for point Pk.

If the user is satisfied with the manual tracing, the coordinates of the final contour are saved together with other necessary information.

The invention has been described in connection with a two dimensional coordinate system, as may be displayed on a flat screen. However, it is to be recognized that this editing technique is not limited to two dimensional contours having only x and y directions. It is possible to edit projections of three dimensional objects in two dimensions by simply extending the centroid calculation to include an axis in the z direction.

The invention has been explained with reference to specific embodiments. Other embodiments will be evident to those of ordinary skill in the art. It is therefore understood that the invention is not limited, except as indicated by the appended claims.

What is claimed is:

1. In a graphical line editing system operative on a display screen of a computer for editing a graphical representation of a closed contour having a single lobe, a method for substituting a replacement segment for a segment of said closed contour, said substituting method comprising:

creating a replacement segment;

establishing a first end point of said replacement segment at a first intersection point of said closed contour;

establishing a second end point of said replacement segment at a second intersection point of said closed contour;

defining a first contour segment and a second contour segment of said closed contour between said first intersection point and said second intersection point;

calculating for said replacement segment a first centroid;

calculating for said first contour segment a second centroid;

calculating for said second contour segment a third centroid;

determining as a first distance value the difference between said first centroid and said second centroid;

determining as a second distance value the difference between said first centroid and said third centroid;

replacing said first contour segment with said replacement contour segment if said first distance value is less than said second distance value; otherwise replacing said second contour segment with said replacement contour segment if said second distance value is less than said first distance value.

2. The method according to claim 1 wherein said closed contour is defined in a Cartesian coordinate system, wherein each said centroid calculation step comprises:

summing all values of points of each segment in x for each point x to obtain a sum in x;

dividing said sum in x by the number of points in x to determine an x coordinate of the centroid;

summing all values of points of each segment in y for each point y to obtain a sum in y;

dividing said sum in y by the number of points in y to determine a y coordinate of the centroid.

3. The method according to claim 2 wherein the segments have directionality, and wherein directionality is used to distinguish between segment types.

* * * * *